United States Patent
Rajamani et al.

(10) Patent No.: US 9,749,832 B2
(45) Date of Patent: Aug. 29, 2017

(54) WIRELESS DISPLAY DISCOVERY AND OPERATION WITH TDLS

(75) Inventors: Krishnan Rajamani, San Diego, CA (US); Maarten Menzo Wentink, Naarden (NL); Vincent Knowles Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 13/240,852

(22) Filed: Sep. 22, 2011

(65) Prior Publication Data

US 2012/0250576 A1   Oct. 4, 2012

Related U.S. Application Data

(60) Provisional application No. 61/386,353, filed on Sep. 24, 2010.

(51) Int. Cl.
*H04W 8/00* (2009.01)
*H04W 40/24* (2009.01)
(Continued)

(52) U.S. Cl.
CPC .......... *H04W 8/005* (2013.01); *H04W 40/24* (2013.01); *H04W 72/1205* (2013.01); *H04W 84/18* (2013.01)

(58) Field of Classification Search
CPC . H04W 8/005; H04W 84/18; H04W 72/1205; H04W 40/24
(Continued)

(56) References Cited

U.S. PATENT DOCUMENTS 6,529,727 B1   3/2003   Findikli et al.
7,657,239 B2   2/2010   Doradla et al.
(Continued)

FOREIGN PATENT DOCUMENTS

CN   101803294 A   8/2010
JP   2013507029 A   2/2013
(Continued)

OTHER PUBLICATIONS 802.11 Working Group: "IEEE P802.11z/D6.0: Draft Standard for Information Technology—Local and metropolitan area networks—Specific requirements—Part 11: Wireless LAN Medium Access Control (MAC) and Physical Layer (PHY) specifications Amendment 6: Extensions to Direct Link Setup (DLS)", IEEE Standard, IEEE, Piscataway, NJ, USA Internet Citation, Aug. 1, 2009 (Aug. 1, 2009), pp. 1-67, XP002633074, Retrieved from the Internet: URL:http://ieeexplore.ieee.org/stamp/stamp.jsp"tp= &arnumber=5286951 [retrieved on Apr. 14, 2011].
(Continued)

*Primary Examiner* — Alpus H Hsu
*Assistant Examiner* — Anthony Luo
(74) *Attorney, Agent, or Firm* — Steven R. Thiel

(57) ABSTRACT

Certain aspects of the present disclosure propose computer-program products for discovery of source or sink devices and their capabilities, prior to establishing a link such as a tunneled direct link setup (TDLS) link. The established link may be used for different applications such as Wi-Fi Display session with the desired source or sink device. The proposed computer-program product may also be applied to devices that utilize peer to peer communication.

36 Claims, 12 Drawing Sheets

(51) Int. Cl.
*H04W 72/12* (2009.01)
*H04W 84/18* (2009.01)

(58) Field of Classification Search
USPC .................................. 370/254, 329; 709/228
See application file for complete search history.

(56) References Cited

U.S. PATENT DOCUMENTS

| | | | |
|---|---|---|---|
| 7,961,693 B2 | 6/2011 | Chu et al. | |
| 8,135,346 B2* | 3/2012 | Zhodzishsky et al. | 455/41.2 |
| 8,208,451 B2 | 6/2012 | Seok | |
| 8,279,757 B2 | 10/2012 | Seok | |
| 8,762,443 B1 | 6/2014 | Kurtz | |
| 2006/0203758 A1* | 9/2006 | Tee et al. | 370/315 |
| 2007/0141984 A1 | 6/2007 | Kuehnel et al. | |
| 2007/0286121 A1 | 12/2007 | Kolakowski et al. | |
| 2008/0069047 A1* | 3/2008 | Yee et al. | 370/331 |
| 2008/0109867 A1* | 5/2008 | Panabaker et al. | 726/1 |
| 2008/0219228 A1 | 9/2008 | Seok et al. | |
| 2009/0274135 A1 | 11/2009 | Seok | |
| 2009/0290521 A1* | 11/2009 | Itagaki | H04W 52/0261 370/311 |
| 2010/0040007 A1* | 2/2010 | Itagaki et al. | 370/329 |
| 2010/0070760 A1 | 3/2010 | Vanderveen et al. | |
| 2010/0177712 A1* | 7/2010 | Kneckt et al. | 370/329 |
| 2010/0272013 A1 | 10/2010 | Horn et al. | |
| 2010/0296441 A1* | 11/2010 | Barkan | 370/328 |
| 2011/0034127 A1 | 2/2011 | Wentink et al. | |
| 2011/0069689 A1 | 3/2011 | Grandhi et al. | |
| 2011/0082939 A1 | 4/2011 | Montemurro et al. | |
| 2011/0082940 A1 | 4/2011 | Montemurro et al. | |
| 2011/0103264 A1 | 5/2011 | Wentink | |
| 2011/0122835 A1 | 5/2011 | Naito et al. | |
| 2011/0145421 A1* | 6/2011 | Yao et al. | 709/228 |
| 2011/0221633 A1* | 9/2011 | Schramm et al. | 342/394 |
| 2011/0225272 A1 | 9/2011 | Montemurro et al. | |
| 2011/0280234 A1 | 11/2011 | Wentink | |
| 2011/0307617 A1 | 12/2011 | Wu et al. | |
| 2012/0087356 A1 | 4/2012 | Wentink | |
| 2012/0151089 A1 | 6/2012 | Ponmudi et al. | |
| 2013/0166759 A1 | 6/2013 | Rajamani et al. | |

FOREIGN PATENT DOCUMENTS

| | | |
|---|---|---|
| TW | 200926684 A | 6/2009 |
| WO | 2007095396 A1 | 8/2007 |
| WO | 2009113834 A2 | 9/2009 |
| WO | WO-2010044533 A1 | 4/2010 |
| WO | WO-2011146513 A1 | 11/2011 |

OTHER PUBLICATIONS

Chien-Chun, et al., "IP2P: A Peer-to-Peer System for Mobile Devices," IEEE Wireless Communications, vol. 16, Issue 2, Apr. 2009, pp. 30-36.
International Search Report and Written Opinion—PCT/US2011/052946—ISA/EPO—Nov. 17, 2011.
Michael Montemurro, Research in Motion; Menzo Wentink, Qualcomm: "doc: IEEE 802.11-09/1218r7; TDLS Peer Discovery", IEEE 802.11 Jan. 18, 2010 (Jan. 18, 2010), pp. 1-13, XP000002656379, Retrieved from the Internet: URL:https://mentor.ieee.org/802.11/dcn/09/11-09-1218-07-000z-tdls-peer-discovery.doc [retrieved on Aug. 4, 2011].
Zorn :Microsoft Vendor-Specific Radius Attributes Informational, Microsoft Corporation; Network Working Group, Mar. 1999, pp. 1-37.
Taiwan Search Report—TW100134414—TIPO—Jun. 15, 2014.

* cited by examiner

WIRELESS DISPLAY DISCOVERY AND OPERATION WITH TDLS

CLAIM OF PRIORITY UNDER 35 U.S.C. §119

The present Application for Patent claims priority to Provisional Application No. 61/386,353, entitled "WI-FI DISPLAY DISCOVERY AND OPERATION WITH TDLS," filed Sep. 24, 2010, and assigned to the assignee hereof and hereby expressly incorporated by reference herein.

BACKGROUND

Field

Certain aspects of the present disclosure generally relate to wireless communications and, more particularly, to device discovery and operation with tunneled direct link setup (TDLS).

Background

Wireless display systems may provide display mirroring where display data is wirelessly transmitted to a sink device for display, allowing elimination of physical cables. In a typical wireless display system, display frames at a source device are captured, compressed, and transmitted over a wireless link, such as a Wi-Fi connection to a sink device. The sink device decodes the data frames and renders them on its display panel.

Prior to establishing a wireless link, a device may need to discover available devices in its vicinity capable of displaying the data.

SUMMARY

Certain aspects of the present disclosure provide a method for wireless communications by a first device. The method generally includes discovering one or more devices of a specific type, identifying one or more of the discovered devices that are capable of supporting tunneled direct link setup (TDLS) operation, selecting a second device from the one or more identified devices based on one or more device capabilities, and establishing a TDLS link with the second device.

Certain aspects of the present disclosure provide a method for wireless communications. The method generally includes receiving a request message from a device, and transmitting a message comprising at least one of a Tunneled Direct Link Setup (TDLS) capability, TDLS preference or TDLS feasibility to the device.

Certain aspects of the present disclosure provide an apparatus for wireless communications. The apparatus generally includes means for discovering one or more devices of a specific type, means for identifying one or more of the discovered devices that are capable of supporting tunneled direct link setup (TDLS) operation, means for selecting a second device from the one or more identified devices based on one or more device capabilities, and means for establishing a TDLS link with the second device.

Certain aspects of the present disclosure provide an apparatus for wireless communications. The apparatus generally includes means for receiving a request message from a device, and means for transmitting a message comprising at least one of a Tunneled Direct Link Setup (TDLS) capability, TDLS preference or TDLS feasibility to the device.

Certain aspects provide a computer-program product for wireless communications by a first device. The computer-program product typically includes a computer-readable medium having instructions stored thereon, the instructions being executable by one or more processors. The instructions generally include instructions for discovering one or more devices of a specific type, instructions for identifying one or more of the discovered devices that are capable of supporting tunneled direct link setup (TDLS) operation, instructions for selecting a second device from the one or more identified devices based on one or more device capabilities, and instructions for establishing a TDLS link with the second device.

Certain aspects provide a computer-program product for wireless communications. The computer-program product typically includes a computer-readable medium having instructions stored thereon, the instructions being executable by one or more processors. The instructions generally include instructions for receiving a request message from a device, and instructions for transmitting a message comprising at least one of a Tunneled Direct Link Setup (TDLS) capability, TDLS preference or TDLS feasibility to the device.

Certain aspects of the present disclosure provide an apparatus for wireless communications. The apparatus generally includes at least one processor and a memory coupled to the at least one processor. The at least one processor is configured to discover one or more devices of a specific type, identify one or more of the discovered devices that are capable of supporting tunneled direct link setup (TDLS) operation, select a second device from the one or more identified devices based on one or more device capabilities, and establish a TDLS link with the second device.

Certain aspects of the present disclosure provide an apparatus for wireless communications. The apparatus generally includes at least one processor and a memory coupled to the at least one processor. The at least one processor is configured to receive a request message from a device, and transmit a message comprising at least one of a Tunneled Direct Link Setup (TDLS) capability, TDLS preference or TDLS feasibility to the device.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
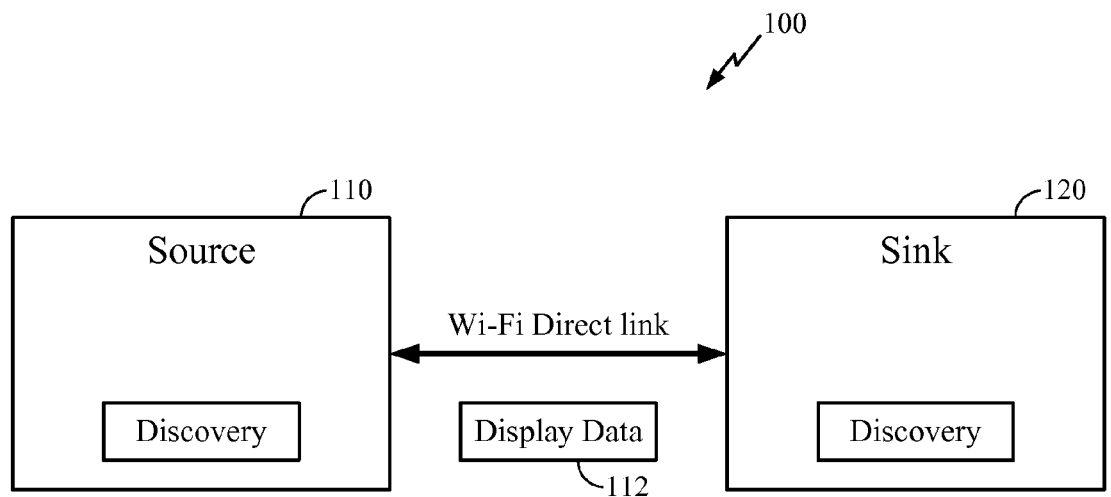
FIG. 1 illustrates an example wireless display system, in accordance with certain aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an evolved Node B (eNode B) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Example Wireless Display System

FIG. 1 illustrates an example wireless display system 100, in which various aspects of the present disclosure may be practiced. As illustrated, the display system may include a source device 110 that wirelessly transmits display data 112 to a sink device 120 for display.

The source device 110 may be any device capable of generating and transmitting display data 112 to the sink device 120. Examples of source devices include, but are not limited to, smart phones, cameras, laptop computers, tablet computers, and the like. The sink device may be any device capable of receiving display data from a source device and displaying it (e.g., on an integrated or otherwise attached display panel). Examples of sink devices include, but are not limited to, televisions, monitors, smart phones, cameras, laptop computers, tablet computers, and the like.

According to certain aspects, the source device 110 and the sink device 120 may include discovery modules 114, 124 that may be used to discover other devices with certain capabilities (e.g., display resolution, etc.) before establishing a communication link.

Figure 2:
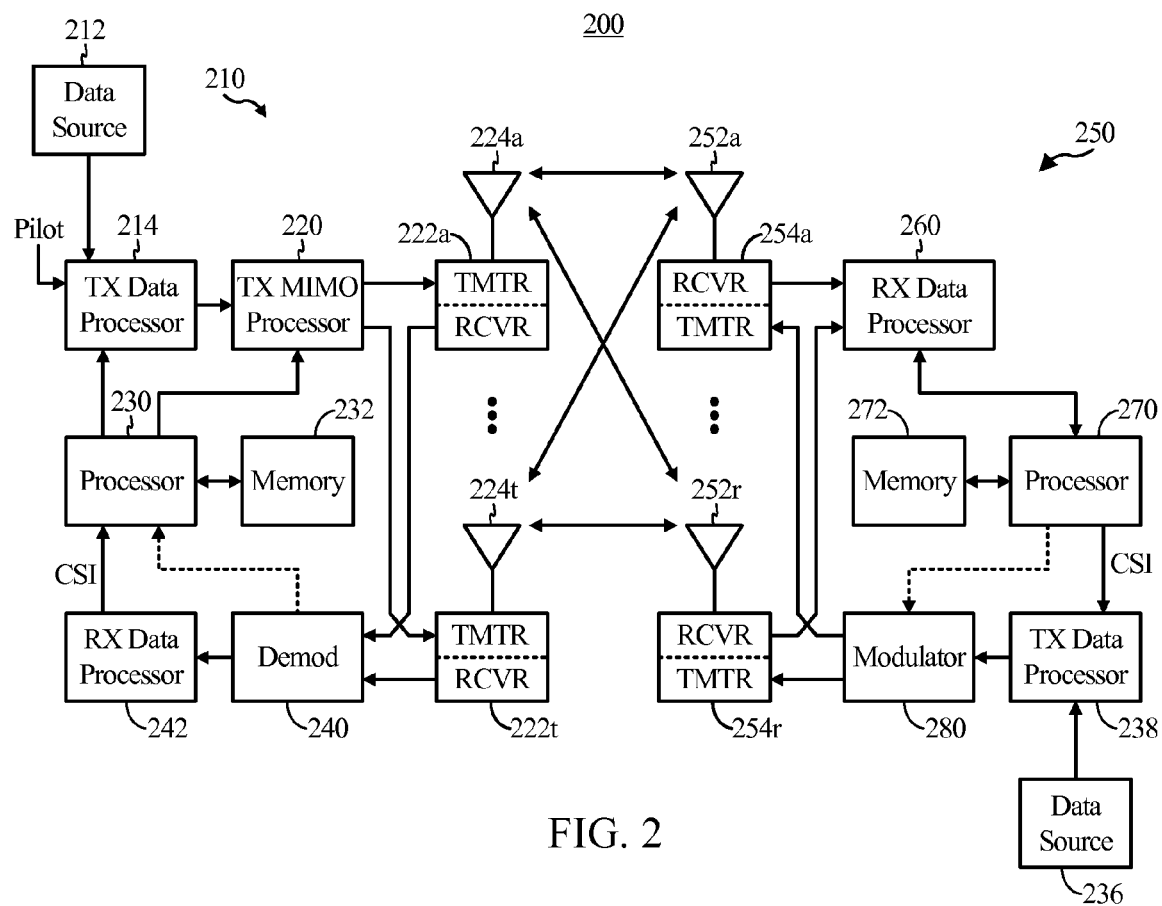
FIG. 2 illustrates a block diagram of a communication system, in accordance with certain aspects of the present disclosure.

FIG. 2 is a block diagram of an aspect of a transmitter system 210 (which may correspond to a source device) and a receiver system 250 (which may correspond to a sink device) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A receive (RX) data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270, which may be coupled with a memory 272, periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

An Example Wireless Display Discovery and Operation with TDLS

Certain aspects of the present disclosure propose methods for discovering source or sink devices and their capabilities prior to establishing a link (e.g., a TDLS link). The link may be used for different applications such as a Wi-Fi Display session in which Wi-Fi refers to the Wireless Fidelity Alliance (WFA) that certifies interoperability of products based on the Institute of Electrical and Electronics Engineers (IEEE) 802.11 family of standards. The proposed method may generally be applied to any two devices that are communicating with each other, such as devices utilizing peer to peer (P2P) communication.

Figure 3:
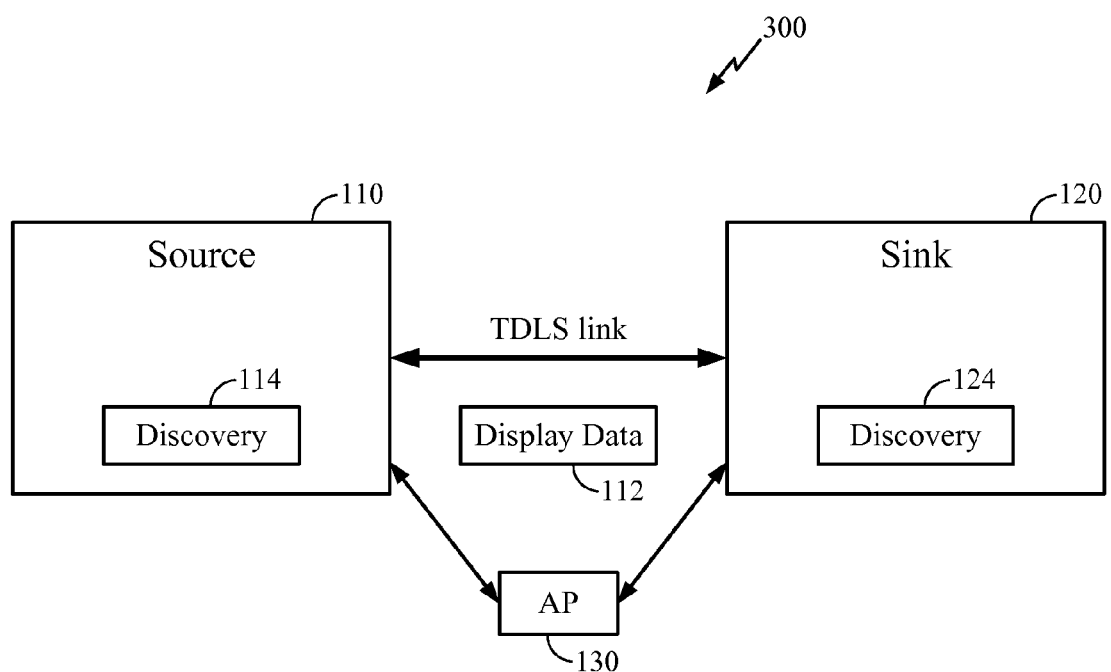
FIG. 3 illustrates another example wireless display system, in accordance with certain aspects of the present disclosure.

FIG. 3 illustrates an example display system 300, in accordance with certain aspects of the present disclosure. The source 110 and the sink 120 devices may discover each other utilizing the scheme described herein before establishing a tunneled direct link setup (TDLS) link. The source and the sink devices may be connected to a common access point 130 in order to establish the TDLS link successfully.

For certain aspects, the source 110 may comprise a discovery module 114 and the sink 120 may comprise a discovery module 124 that may be used to discover the devices that have a certain type (e.g., Wi-Fi Display source or sink), or display-specific attributes and capabilities (e.g., display resolution, TDLS capability, preference to establish a TDLS link, and the like).

Certain aspects of the present disclosure may take advantage of the following environmental factors for establishing a link between two devices (e.g., a TDLS link to be used for Wi-Fi Display). First, older standards such as the Wi-Fi Direct standard may be supported by new devices that may utilize wireless display sessions (e.g., Wi-Fi Display), even those devices that prefer to use a TDLS link. Therefore, the new devices may utilize services of the older standards (e.g., Wi-Fi Direct) for a priori discovery of the device type (e.g., Wi-Fi Display source/sink) as well as Layer 2 discovery of higher layer attributes and capabilities of the discovered source/sink devices.

On the other hand, discovering a device using a specific standard may not obligate the source and sink devices to establish a link using the exact same standard. For example, performing the above steps (e.g., using Wi-Fi Direct for a priori discovery) may not obligate the Wi-Fi Display source and sink devices to establish a Wi-Fi Direct link between them. In addition, the Wi-Fi Direct standard does not preclude the source and the sink devices from establishing a TDLS link as an operational direct link for a Wi-Fi display session.

For certain aspects, a device may perform the a priori discovery of display source (or sink) devices in different ways, for example, via Wi-Fi Direct based procedures. The device may select the desired display source (or sink) and establish a TDLS link between the source and the sink devices, if both devices support and prefer TDLS operation. As a result, the device may conduct all subsequent transactions (e.g., control traffic for establishing a display session, maintenance, teardown, and all the display payload traffic) over the established TDLS link. Therefore, a device may utilize two different standards (e.g., Wi-Fi direct and TDLS) for the a priori discovery of another device, and subsequent transactions with the device. It should be noted that this scheme may not impose any changes to the current standards such as the IEEE 802.11z/TDLS or the Wi-Fi Direct standard.

Figure 4:
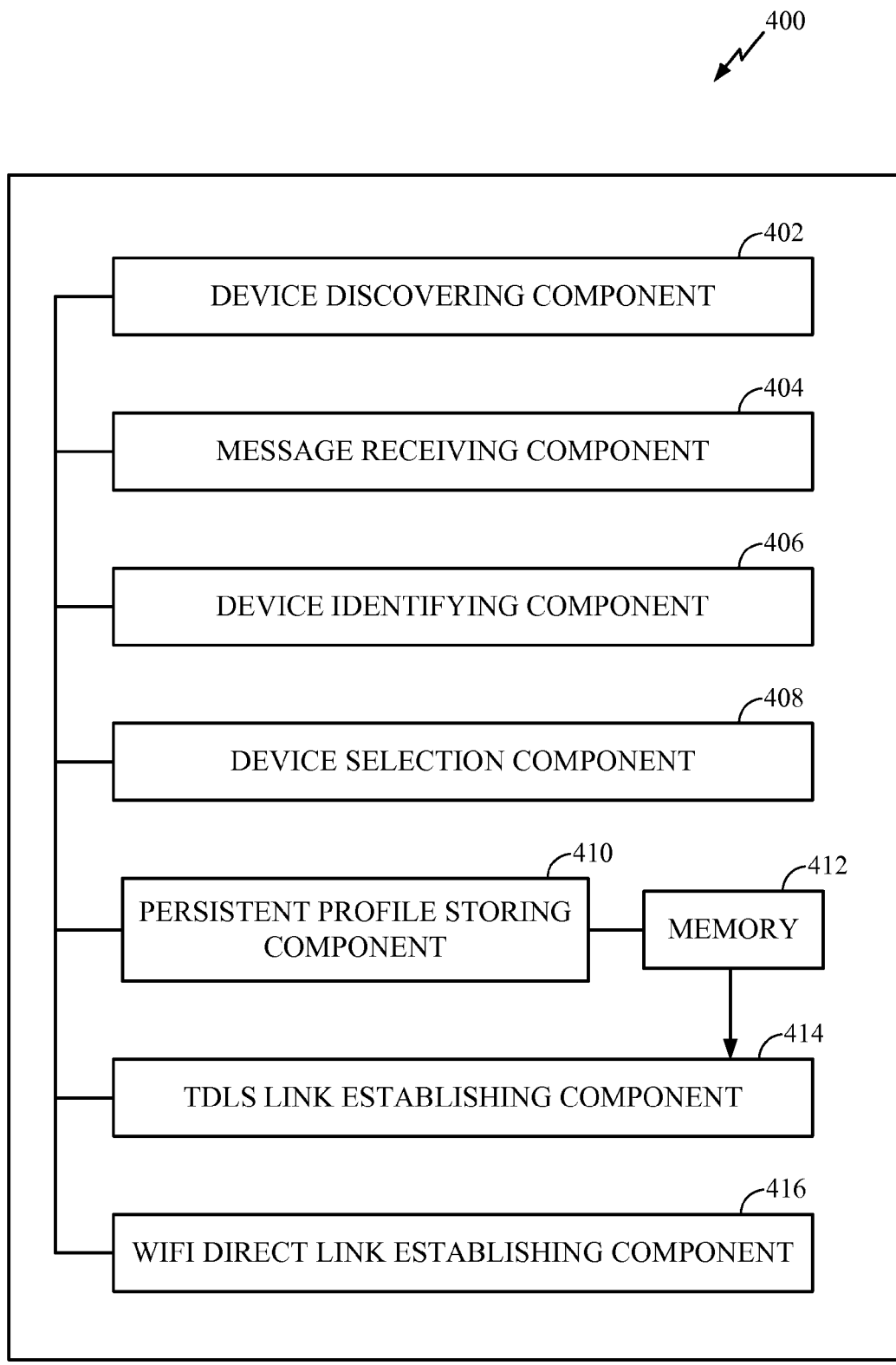
FIG. 4 illustrates an example block diagram of a source device capable of performing the proposed discovery operations, in accordance with certain aspects of the present disclosure.

FIG. 4 illustrates an example block diagram of a source device 400 capable of performing the proposed discovery operations, in accordance with certain aspects of the present disclosure. The source device may include a device discovering component 402, a message receiving component 404, a device identifying component 406, a device selection component 408, a persistent profile storing component 410, a memory 412, TDLS link establishing component 414, and a Wi-Fi direct link establishing component 416.

The device discovering component 402 may discover one or more source or sink devices in the vicinity. The source device may request information about device type and capabilities of the neighboring devices. The source device may receive response messages that may include device capabilities from the neighboring devices. The source device may then identify devices of a certain type with certain capabilities using the device identifying component 406. The source device may then select a device using the device selection component 408. The source device may establish a TDLS link or a Wi-Fi Direct link with the selected device utilizing the TDLS link establishing component 414 or Wi-Fi Direct link establishing component 416, respectively. The source device may store information about the selected device in a memory 412 using a persistent profile storing component 410.

In order to avoid trial and error while locating desired devices that support display operations over a link (e.g., Wi-Fi Display operation over a TDLS link), a discovery and selection method is described herein that may comprise some or all of the following twelve steps.

For certain aspects, a unique value may be defined for the device type for a source device (step 1). The defined value may be used in the Wi-Fi Simple Configuration Specification (WSC) information element (IE) in peer to peer (P2P) probe request/response. For another aspect, a unique value may be defined for the device type for a sink device (step 2). The defined value may also be used in the WSC IE in P2P probe request/response.

For certain aspects, one or more query request/response messages may be used for a priori discovery of the display attributes and capabilities (step 3). For example, the messages in IEEE 802.11u generic advertising service (GAS) may be used for a priori discovery of the display attributes and capabilities.

The steps 1, 2, and 3 mentioned above may be performed for discovering devices of particular type using a standard such as the Wi-Fi Direct. The following elements may be used for establishing and utilizing a TDLS link between the two devices. As an example, the TDLS link may be used for Wi-Fi Display.

For certain aspects, a specific field may be added to the query request/response messages to denote capability of supporting display operation (e.g., Wi-Fi Display) over a TDLS link (step 4). For example, this field may be a binary field that shows whether or not display operations are supported over TDLS link.

For certain aspects, at step 5, one or more fields may be added to the query request/response messages to help deduce the current feasibility of establishing a TDLS session. For example, the feasibility of TDLS link field may include a current basic service set identifier (BSSID) associated with the wireless local area network (WLAN) access point.

For certain aspects, at step 6, one or more fields may be added to the query request/response message to denote preference of the device to use TDLS for a display session (e.g., a Wi-Fi Display). For example, a binary field may show the preference. The preference field may also include other qualification information. For certain aspects, the preference about using a TDLS link may also be implicitly specified by a suitable value in the feasibility field. For example, a zero value for the advertized BSSID in the feasibility field may be used to preclude the choice of TDLS.

Figure 5:
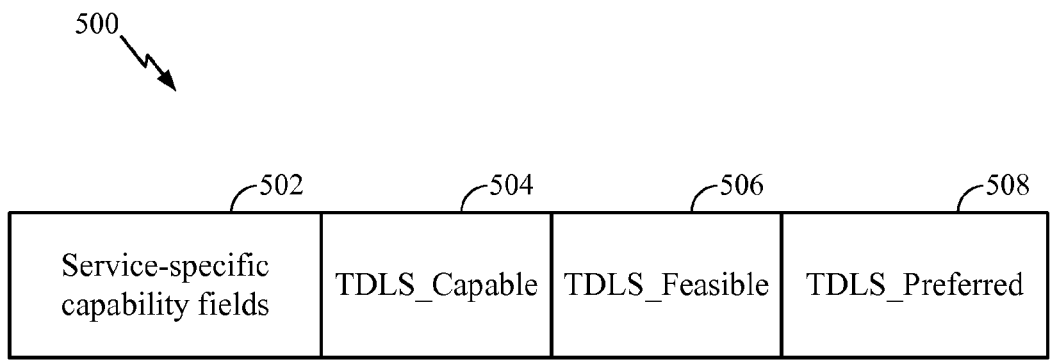
FIG. 5 illustrates a proposed message format, in accordance with certain aspects of the present disclosure.

FIG. 5 illustrates a proposed message format that may be used by a device (e.g., source or sink) to communicate device-specific properties to other devices, in accordance with certain aspects of the present disclosure. As illustrated, the message transmitted by the device may include service-specific capability fields 502, TDLS_capable field 504, a TDLS_feasible 506 field, and a TDLS_preferred field 508. The service-specific capability fields 502 may include information about capabilities of the device such as the information in an IEEE GAS query request/response message. The TDLS_capable field 504 may include information about capability of the device to perform TDLS operations. The TDLS_feasible 506 field may include a BSSID or other information about feasibility of establishing a TDLS link. The TDLS_preferred field 508 may show willingness of the device to establish a TDLS link.

For certain aspects, values of device capabilities (e.g., TDLS capability, TDLS feasibility or TDLS preference) of the source and sink devices may be discovered separately by each peer device. These discoveries may be accomplished via two separate query request/response sequences in each direction. For example, the source device may send a message to a sink device to inform the sink device of its own capabilities. The sink device may also send a message including its capabilities to the source device. For certain aspects, the source device may include its own capabilities in the capability request frame that transmits to the sink device.

Figure 6:
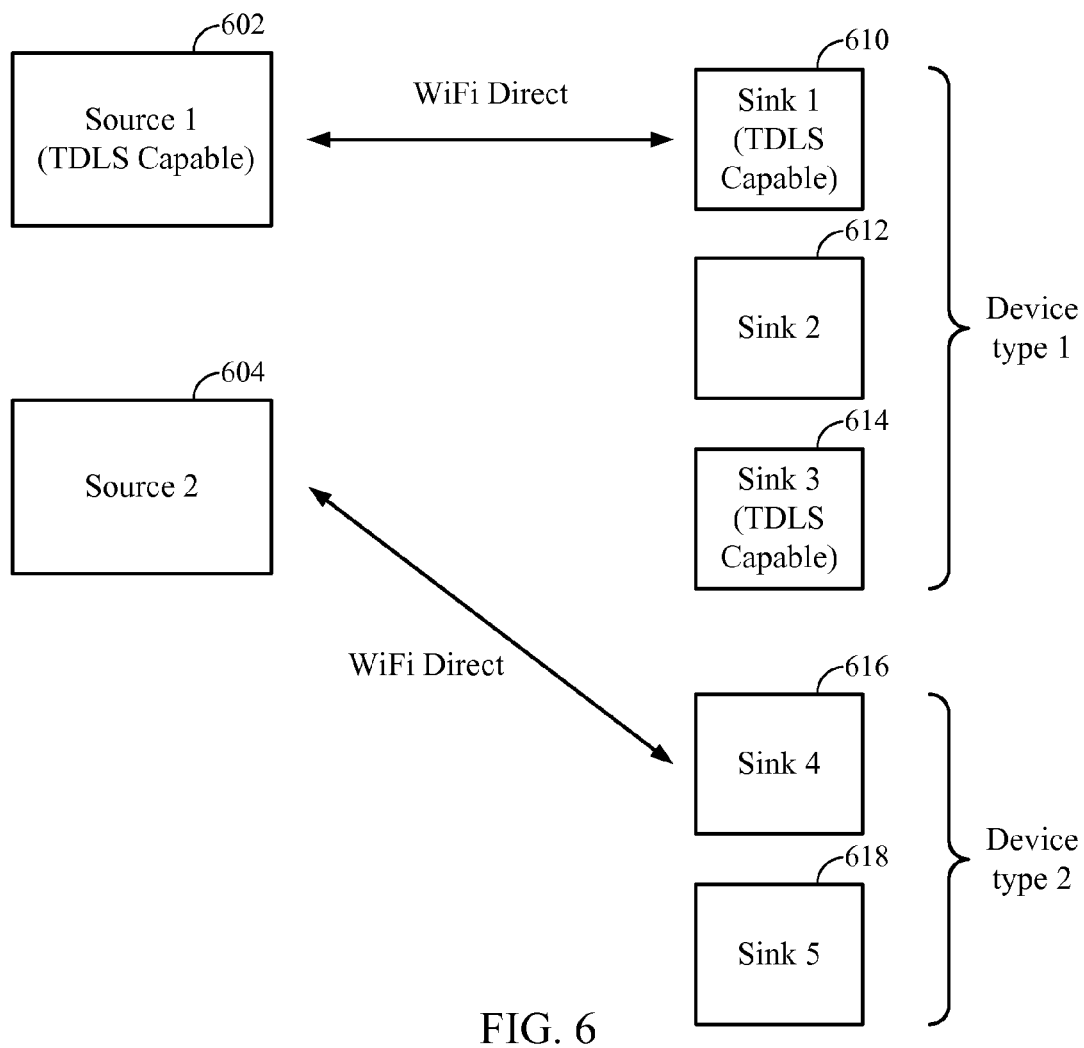
FIG. 6 illustrates a network comprising a plurality of source and sink devices, in accordance with certain aspects of the present disclosure.

FIG. 6 illustrates a network comprising a plurality of source and sink devices. As illustrated, a plurality of source devices (e.g., source1 602, source2 604) and a plurality of sink devices (e.g., sink1 610, sink2 612) may be located in close vicinity of each other. In this example, sink1 610, sink2 612 and sink3 614 are from device type1, and sink4 616 and sink5 618 are from device type2. There may be a link (e.g., a Wi-Fi Direct link) between some of the sources and some of the sinks. For example, source1 may establish a direct link with sink1. As illustrated, one or more of the source or sink devices (e.g., source1, sink1 and sink3) may be capable of establishing a TDLS link.

Figure 7A:
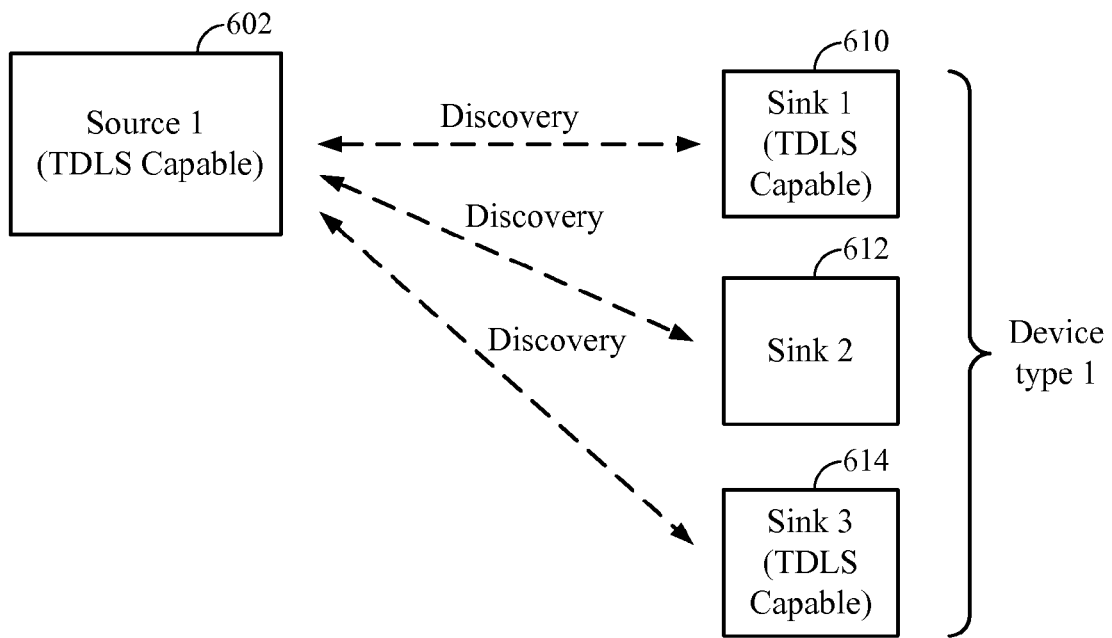
FIGS. 7A-7C illustrate a network utilizing the proposed discovery method, in accordance with certain aspects of the present disclosure.
Figure 7B:
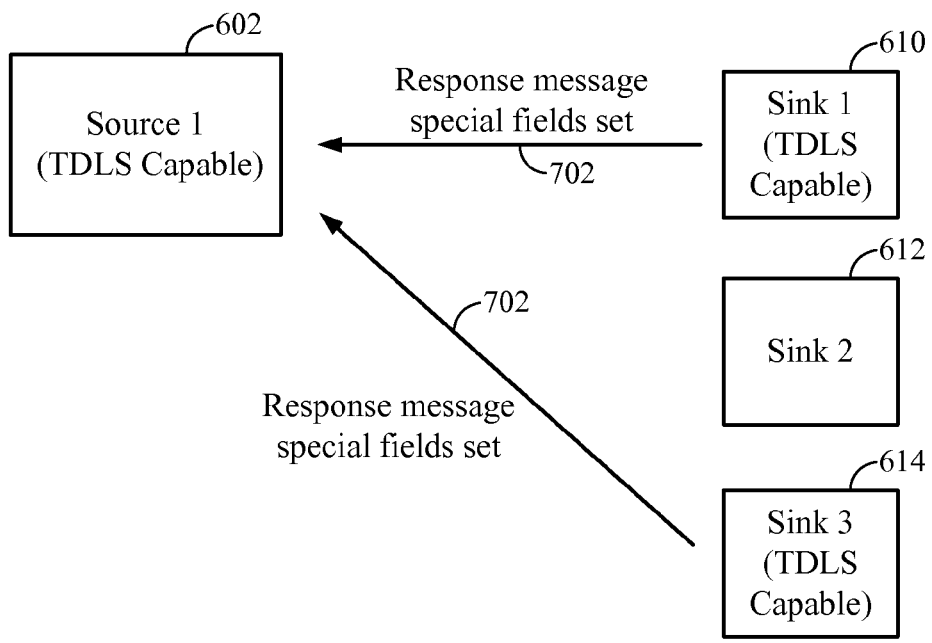
Figure 7C:
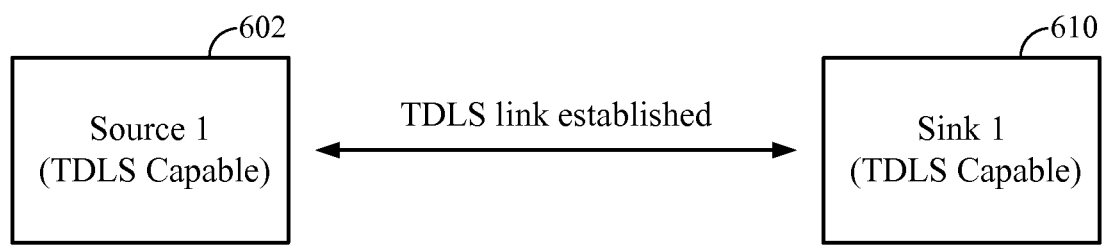

FIGS. 7A-7C illustrate a network utilizing the discovery method as described herein, in accordance with certain aspects of the present disclosure. As illustrated in FIG. 7A, a source may discover one or more sink devices that are of a certain type (e.g., device type1), corresponding to the step 802 in FIG. 8.

Figure 8:
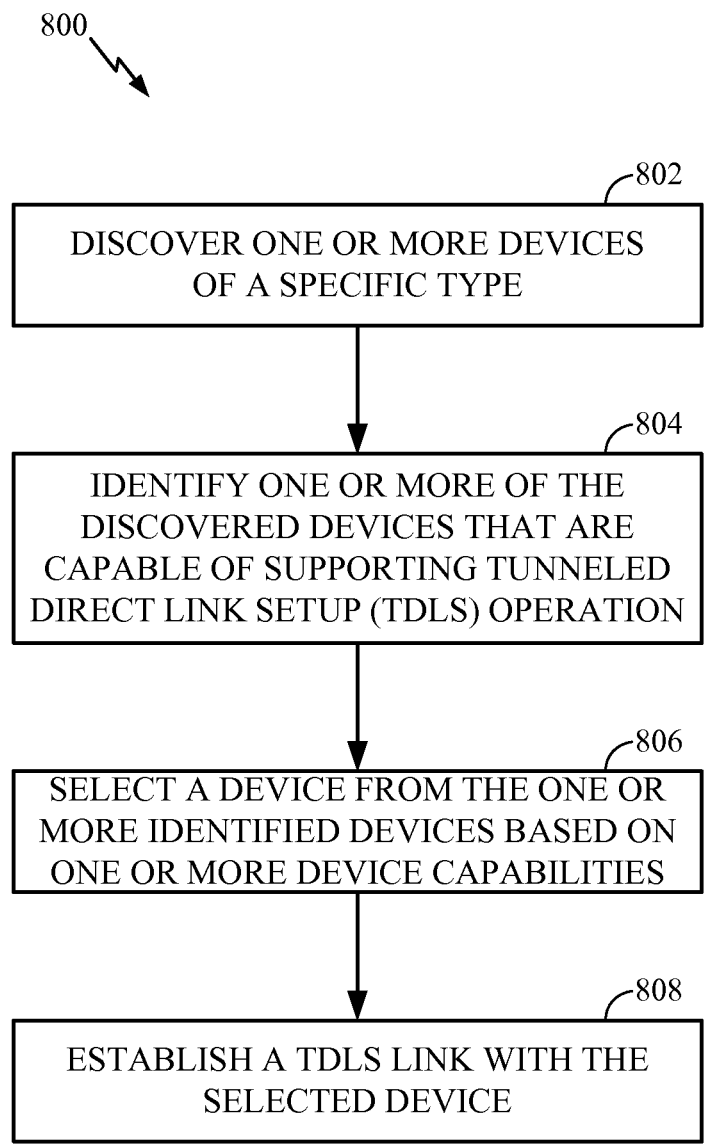
FIG. 8 illustrates example operations for discovery and operation with tunneled direct link setup (TDLS), in accordance with certain aspects of the present disclosure.

FIG. 7B corresponds to the step 804 in FIG. 8, in which the sink devices transmit response messages 702 to the source device. The response messages may comprise special fields as described in FIG. 5 to convey capability, feasibility and preference about establishing a TDLS link with the source device. Utilizing the received messages, sink1 may identify the devices that are capable of establishing a TDLS link, and select one of the devices as illustrated in FIG. 7C. Source1 may then establish a TDLS link with the sink1 and perform the subsequent communications with the sink1 through the TDLS link.

At step 7 of the discovery and selection method described herein, procedures and rules may be defined to deterministically converge to the choice between attempting a link setup using two different standards (e.g., TDLS setup vs. Wi-Fi Direct peer to peer association), after the aforementioned discovery. These procedures may implicitly be determined at both ends, based on the newly defined fields in the response message, as described in FIG. 5. For example, utilizing the steps illustrated in FIG. 9, the device may decide whether or not to proceed with a TDLS link based on the messages received from the neighboring sink devices. For example, the device may check whether or not the sink device is TDLS capable (e.g., step 906 in FIG. 9), whether or not the sink device prefers to establish a TDLS link (e.g., step 907 in FIG. 9). The device may also check the feasibility of establishing a TDLS link (step 909 in FIG. 9). For example, by checking if both the source and the sink devices are connected to a common access point the source device may deduce if the TDLS link is feasible or not. It should be noted that there may be other ways to "determine" the choice between TDLS vs. Wi-Fi Direct. In addition, various combinations of the above recited factors may be utilized or employed in the determination.

As an example, TDLS may be chosen if and only if both sides indicate capability and preference for TDLS operation, and share a common BSSID (e.g., feasibility check). This result may be qualified based on uniformly imposed additional implicit constraints known to both sides (e.g., support for and current use of the Wi-Fi protected access version 2 (WPA2) in the BSS).

Although the decision to use TDLS may be inferred at both ends, for certain aspects, a separate packet data unit (PDU) may be defined to synchronize the TDLS communication on the common BSS channel between the source and the sink devices. The synchronization PDU may be transmitted in acknowledged mode with a limited number of retransmissions (e.g., two), following which the sender may start procedures for establishing a TDLS link. Either device (e.g., source or sink) may transmit the synchronization PDU to the peer device. The receiver of the synchronization PDU may proceed to establish a TDLS link (Step 9) after sending an acknowledgment (ACK) message, regardless of any pending retransmissions of its own.

For certain aspects, in the absence of the synchronization PDU, synchronization may be defined as part of the message exchange for a priori discovery of the display attributes and capabilities as described in Step 3. However, the a priori discovery may be non-binding upon either side to establish any direct link. The actual decision to connect may also be driven by user choice, for example, through a user interface requesting user to select from a list of discovered devices (e.g., source or sink devices), based on a name or the like.

For certain aspects, either side (e.g., the source or the sink device) may choose to influence the outcome to be Wi-Fi Direct (e.g., avoid setting up a TDLS link), by pre-imposing any additional local policies prior to advertizing the preference field 508.

If TDLS is not the preferred link-establishing protocol in step 7, at step 8 of the discovery and selection method described herein, the source and the sink devices may proceed to establish a peer to peer link, for example, using Wi-Fi Direct or any other standard. The devices may then establish a Display session using the peer to peer link. It should be noted that either of the source or the sink devices may initiate the link establishment process. As an example, link establishment protocols in Wi-Fi Direct standard may be used to establish the link. On the other hand, session establishment protocols (e.g., over the direct link) may be specified by the standard used for the display session (e.g., Wi-Fi Display).

If TDLS is mutually chosen by the source and the sink devices, at step 9, both devices may proceed to TDLS discovery, followed by TDLS setup to establish the direct link, which could be followed by display session establishment over the selected TDLS link. One or both sides may initiate the link establishment process. As an example, the IEEE 802.11z/TDLS standard may be used for the TDLS discovery and TDLS link establishment protocols. Session establishment protocols (e.g., over the TDLS link) may be specified by the standard used for the display session (e.g., Wi-Fi Display).

Certain aspects of the present disclosure define procedures and rules to deterministically fallback to Wi-Fi Direct (e.g., fallback to step 8) if establishing a TDLS link fails (step 10). Failure in establishing a TDLS link may be due to different parameters such as pathological channel conditions, as other system level checks were completed in step 7, with deterministic convergence on the choice of TDLS. The likelihood of success with Wi-Fi Direct (e.g., after fallback) may not necessarily be any higher than the success in establishing the TDLS link. The fallback may succeed if the social channel(s) used for the Wi-Fi Direct link establishment are better than the BSS channel used for TDLS setup.

For certain aspects, a timeout mechanism (e.g., a failsafe timer), which may commonly be agreed upon by the source and sink devices, may be used to abandon TDLS setup (e.g., step 9) and fallback to a Wi-Fi Direct link (e.g., step 8). The default value of the timeout may be specified in a protocol used for the wireless display. The default timeout value may be overridden via additional preference fields 508.

For certain aspects, a unique timeout value may be used to denote infinite timeout (e.g., no fallback to Wi-Fi Direct). In the event of a mismatch in the timeout preference expressed by the source and the sink devices, a pre-determined function such as minimum, maximum, or average of the timeout preference values may be used.

For certain aspects, the failsafe timer may be started at each side as soon as TDLS is chosen as the communication standard (e.g., in step 7). Selection of TDLS may be treated as a binding decision on both sides to proceed to TDLS discovery and link establishment as described in step 9. Therefore, the start of the TDLS discovery may be assumed to be approximately synchronized (considering the nominal magnitude of the failsafe timeout duration, e.g., in the order of seconds).

FIG. 8 illustrates example operations that may be performed by a first device for discovery and operation with TDLS, in accordance with certain aspects of the present disclosure. At 802, a first device may discover one or more devices of a certain type. The first device may send one or more request messages to other devices in its vicinity asking for information about device capabilities such as device type, whether or not the devices are capable of supporting TDLS, their willingness to establish a TDLS link and the like. Each of the devices may respond by transmitting a message to the first device comprising the requested information. As an example, the first device may utilize Wi-Fi Direct based procedures for discovery. For example, the first device may be a laptop and may look for devices of type 'display' that are capable and willing to establish a TDLS link with the first device.

After receiving the requested information from the neighboring devices, at 804, the first device may identify one or more of the devices that are capable of supporting TDLS operation by analyzing the received messages from the neighboring devices. At 806, the first device selects a second device from the one or more identified devices based on the device capabilities. If two or more of the devices are identified as good candidates for a TDLS link, the first device may select one of the devices randomly or based on one or more parameters such as channel conditions, feasibility of the TDLS link and the like.

At 808, the first device may establish a TDLS link with the second device. For example, the first device may proceed to perform TDLS discovery, TDLS setup and display session establishment. The first device may utilize the established TDLS link for any subsequent communication with the second device.

Figure 8A:
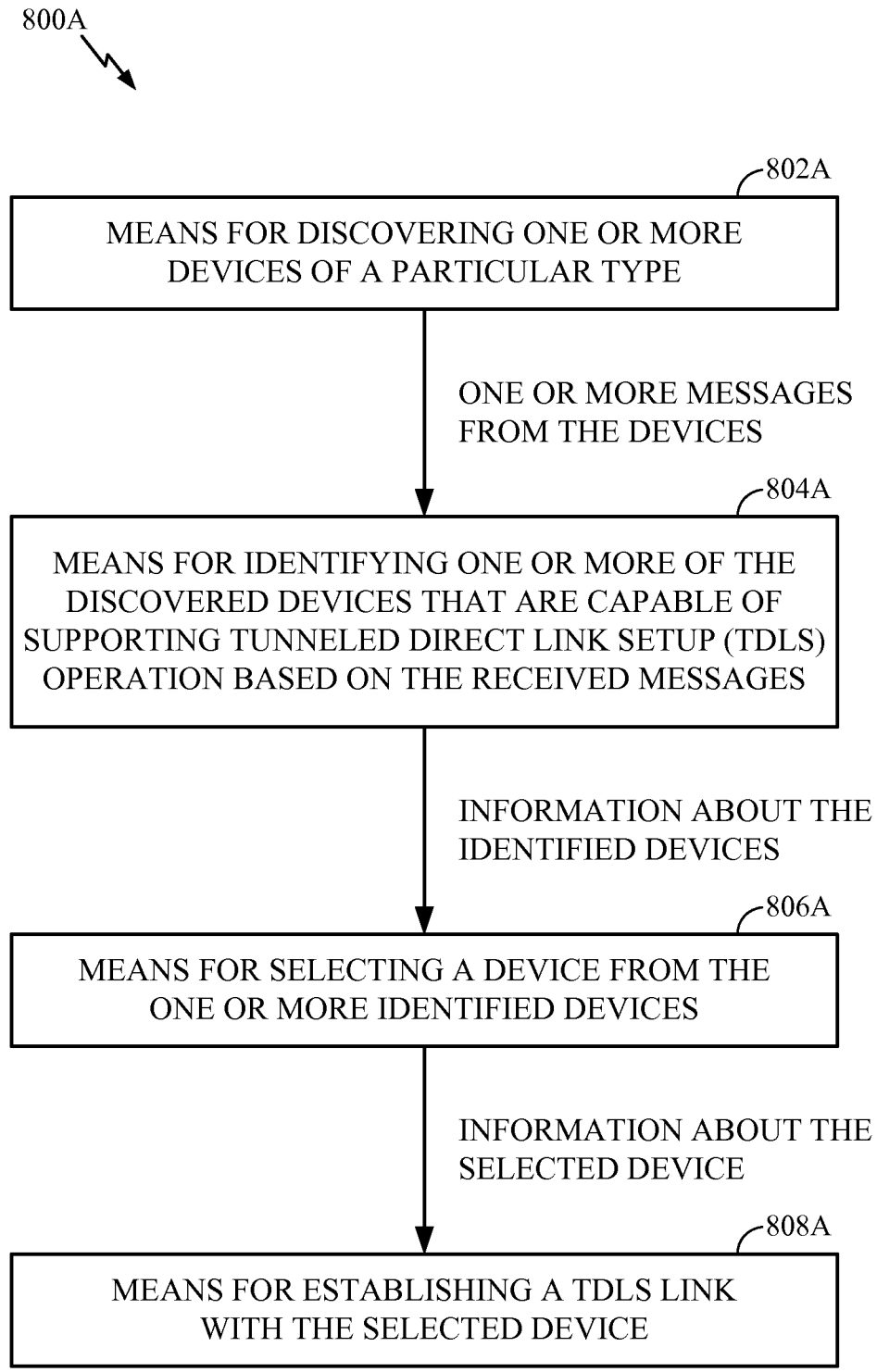
FIG. 8A illustrates example components capable of performing the operations illustrated in FIG. 8.

FIG. 8A illustrates a functional block diagram of a device capable of performing the proposed discovery method. The device may comprise means for discovering one or more devices of certain type. The means for discovering 802A may be a circuit or a processor capable of performing discovery procedures. After discovery of the devices, the device may deliver one or more messages received from the discovered devices to the means for identifying one or more discovered devices that are capable of supporting TDLS operation (804A). Information about the identified devices may be given to the means for selecting 806A a device from the one or more identified devices. One of the devices is selected by the means for selecting a device and information about the selected device may be given to the means for establishing a TDLS link with the selected device (808A). It should be noted that the means for identifying may be a circuit or a processor capable of identifying a device, the means for selecting may be a circuit or a processor capable of selecting a device and the means for establishing may be circuit or processor capable of establishing a TDLS link with the selected device.

Figure 9:
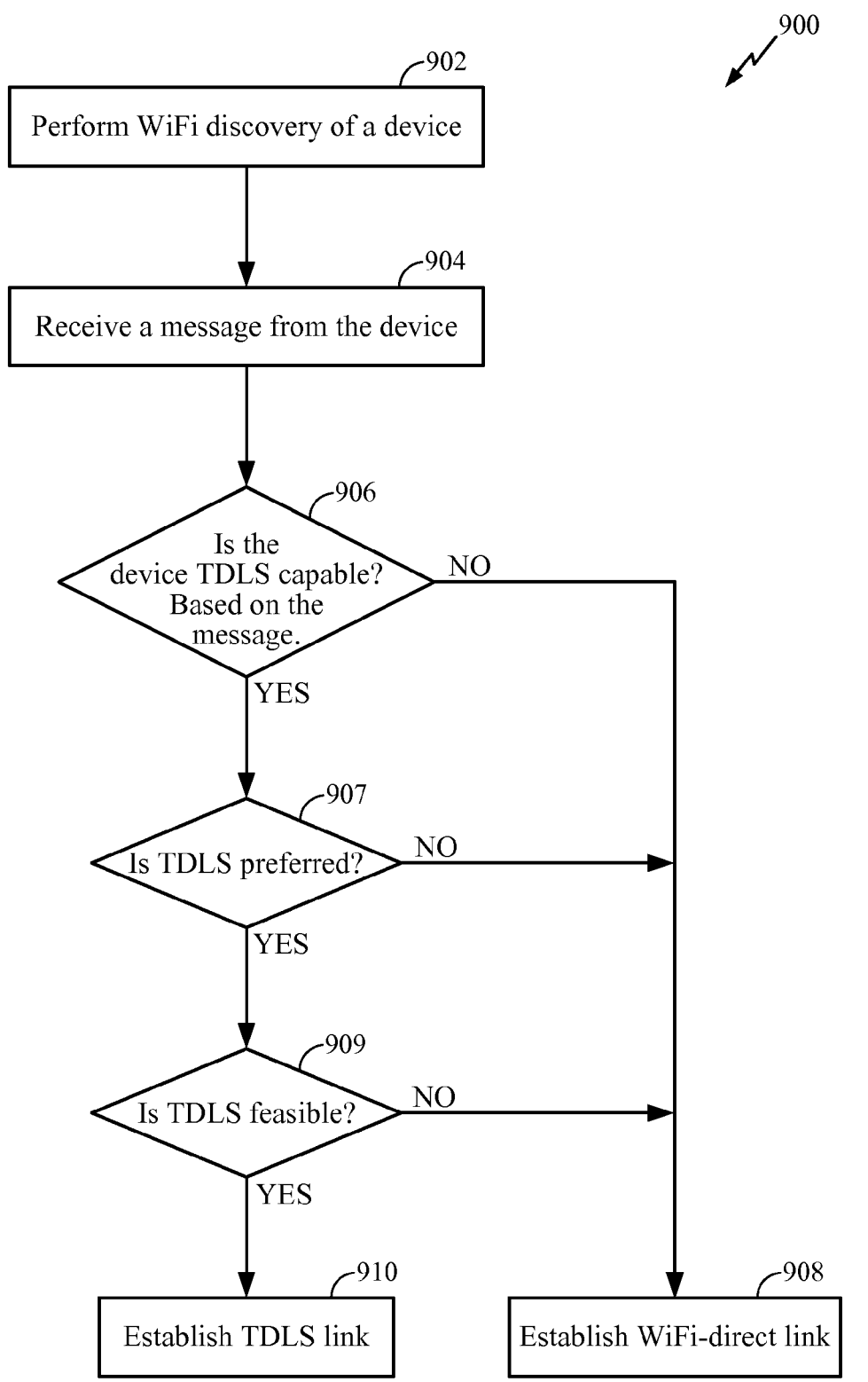
FIG. 9 illustrates a flow diagram of the proposed discovery method, in accordance with certain aspects of the present disclosure.

FIG. 9 illustrates a flow diagram 900 of a discovery method as described herein, in accordance with certain aspects of the present disclosure. At 902, a source device may find a device through Wi-Fi discovery operations. At 904, the device may receive a message from the device (e.g., with the format illustrated in FIG. 5). The source device may check to see if the device is TDLS capable (at 906), if the TDLS link is preferred by the device (at 907), and if establishing a TDLS link is feasible (at 909). If all of the above conditions are met, at 910, the sink may establish a TDLS link with the source. If any of the conditions 906, 907 or 909 is not met, at 908, the source and the sink may establish a Wi-Fi Direct link or maintain their current Wi-Fi Direct link.

For certain aspects, at step 11 of the discovery and selection method described herein, the results of the device/capability discovery sequence may be stored in a memory. Therefore, the source and/or sink devices may save the outcome as part of a persistent profile associated with the partner device. For example, source1 602 may save the messages received from sink1 610 about its TDLS capability/preference/feasibility in a persistent profile that is associated with sink1 610.

For certain aspects, at step 12, the persistent profile may be used to accelerate subsequent TDLS Display connections between the same pair of devices. In this case, the source and/or the sink device may choose to directly attempt unicast TDLS discovery with the known medium access control (MAC) address of the partner device and proceed directly to TDLS discovery and link establishment with the device. As an example, the MAC address of the partner device may be mapped to a user-friendly name of the peer as part of the profile.

Figure 10:
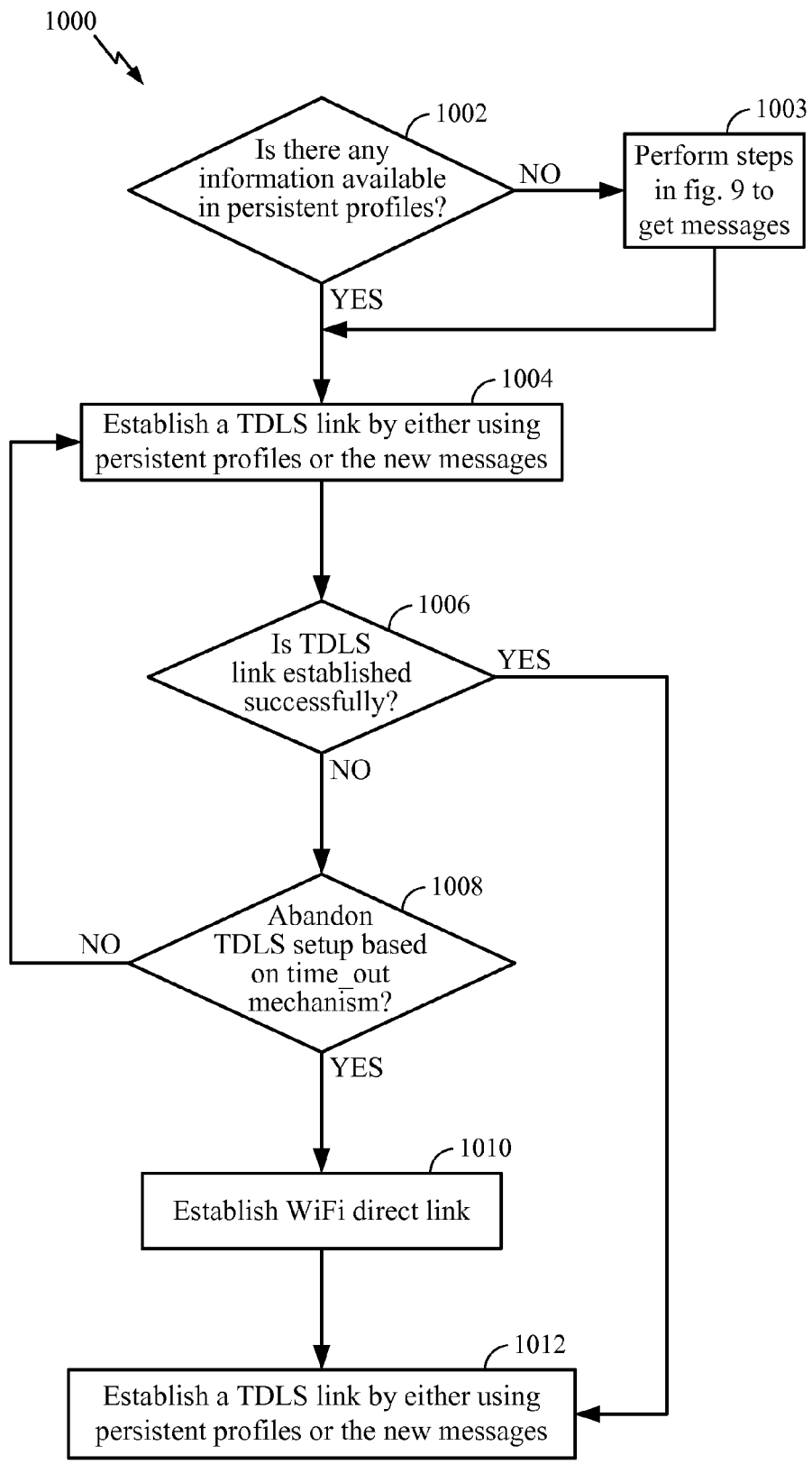
FIG. 10 illustrates another flow diagram of the proposed discovery method, in accordance with certain aspects of the present disclosure.

FIG. 10 illustrates a flow diagram 1000 for the proposed discovery method using the information in the persistent profile, in accordance with certain aspects of the present disclosure. At 1002, a source device checks to see if any information is available about the devices in vicinity in a persistent profile. If not, the source device may perform steps 902 through 909 of FIG. 9 to get a message containing the TDLS capability/preference and feasibility information (at 1003). At 1004, the source device utilizes the available information (e.g., persistent profile or the new message) to establish a TDLS link. At 1006, the device checks to see if the TDLS link is established successfully. If yes, at 1012, the device may save the messages/parameters of the TDLS link for the sink device in a persistent profile for future use. If the TDLS link is not established successfully, the device may check whether or not to abandon the TDLS setup based on time-out mechanisms (at 1008). If the device decides to abandon the TDLS setup, at 1010, the device may fall back to establishing a Wi-Fi direct link and save the parameters of the link/device in a persistent profile.

Figure 11:
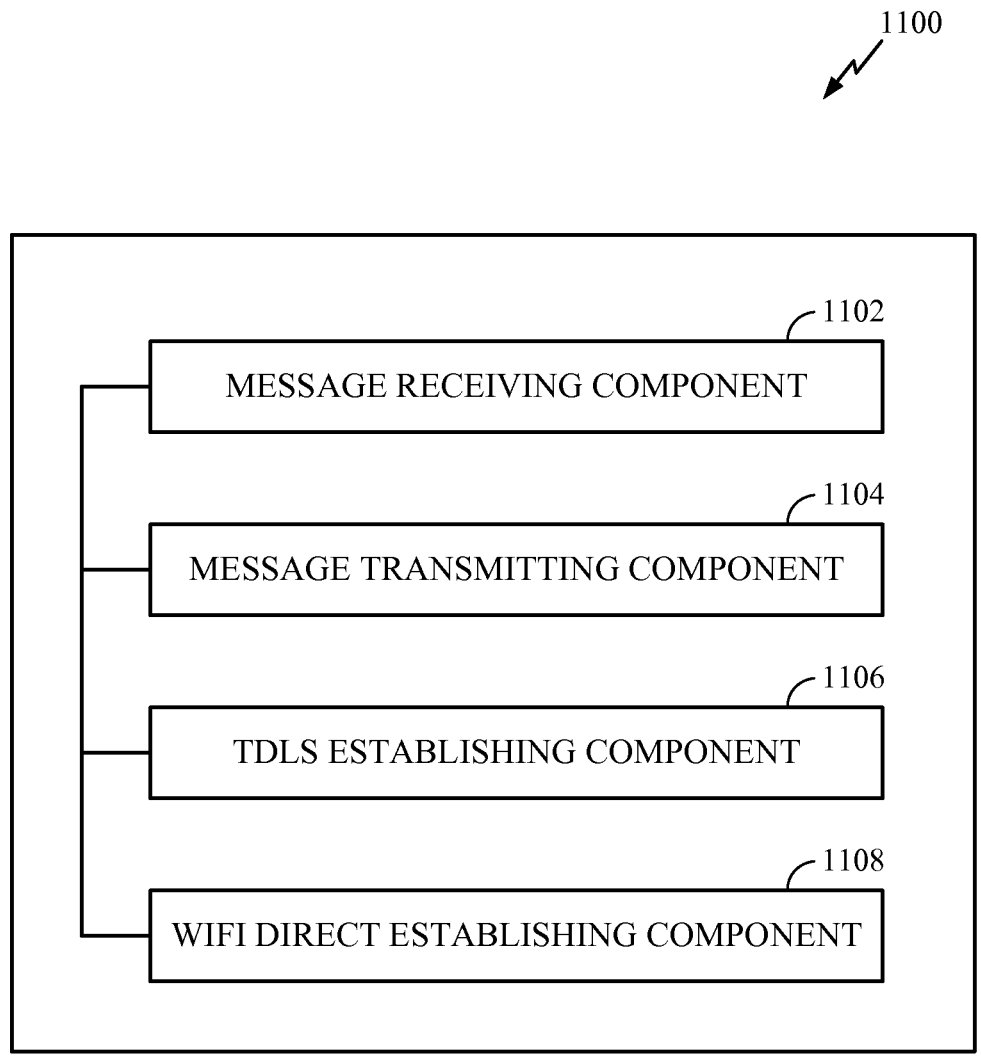
FIG. 11 illustrates an example block diagram of a sink device capable of performing the proposed discovery operations, in accordance with certain aspects of the present disclosure.

FIG. 11 illustrates an example block diagram of a sink device 1100 capable of performing the proposed discovery operations, in accordance with certain aspects of the present disclosure. The sink device 1100 may include a message receiving component 1102, a message transmitting component 1104, a TDLS link establishing component 1106, and a Wi-Fi Direct establishing component 1108. The sink device may receive a request message from the source device. In response, the sink device may transmit a message including its type, TDLS capability, feasibility or preference using the message transmitting component 1104. If the device is chosen by the source device, the sink device may establish either a TDLS link or a Wi-Fi Direct link with the source device using the TDLS link establishing component 1106 or the Wi-Fi Direct establishing component 1108, respectively.

Figure 12:
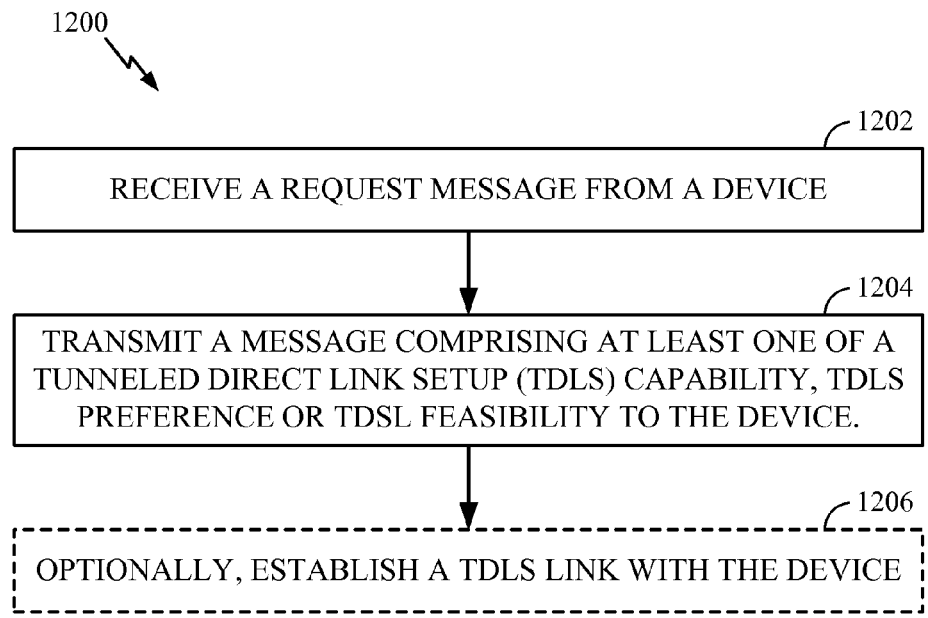
FIG. 12 illustrates example operations for discovery and operation with tunneled direct link setup (TDLS) that may be performed by a sink device, in accordance with certain aspects of the present disclosure.

FIG. 12 illustrates example operations 1200 that may be performed by a sink device for the proposed discovery mechanism, in accordance with certain aspects of the present disclosure. At 1202, the sink device may receive a request message from a source device. The request message may be received using Wi-Fi Direct procedures. The sink device may generate a message in response to the request message. At 1204, the sink device may transmit the message comprising at least one of a TDLS capability, TDLS preference or TDLS feasibility to the source device. At 1206, the sink device may optionally establish a TDLS link with the source device.

Figure 12A:
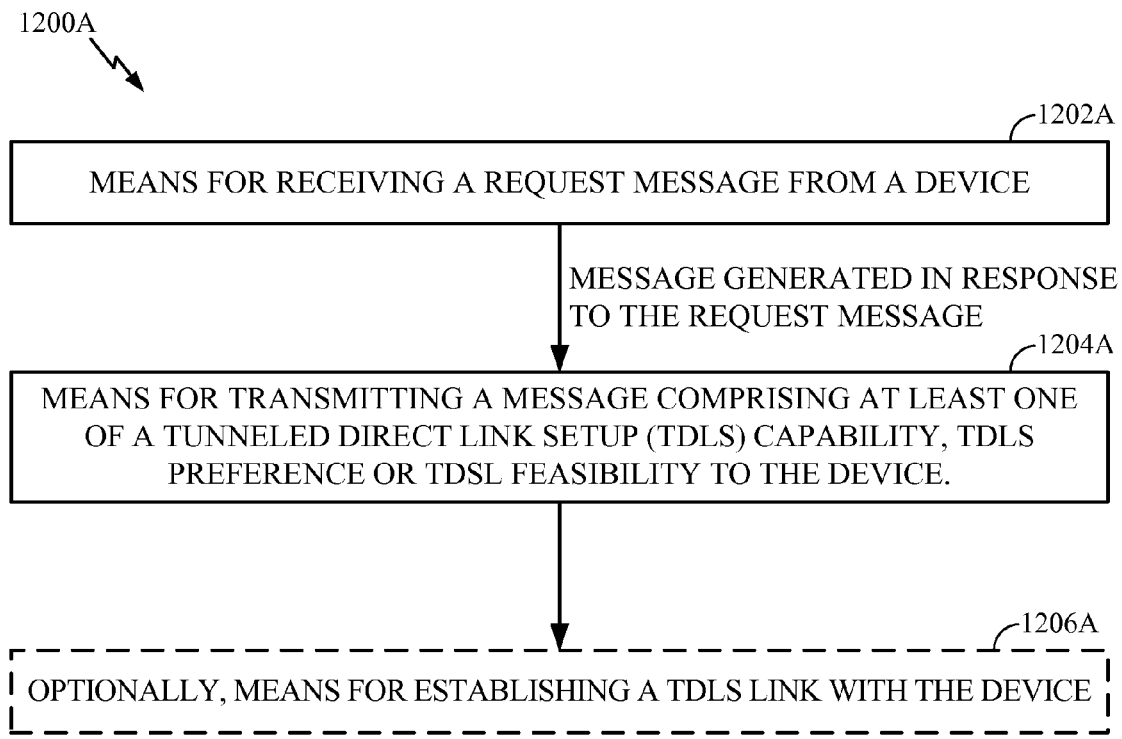
FIG. 12A illustrates example components capable of performing the operations illustrated in FIG. 12.

FIG. 12A illustrates a functional block diagram of a device capable of performing the operations in FIG. 12. The device may comprise means for receiving a message 1202A, means for transmitting a message 1204A and means for establishing a TDLS link 1206A. The means for receiving a message may comprise a receiver or message receiving component 1102. The means for transmitting a response message may comprise a transmitter or message transmitting component 1104, and the means for establishing a TDLS link may comprise a circuit or processor capable of establishing the TDLS link, such as the TDLS link establishing component 1106.

For certain aspects, if the source and the sink are served by two different access points, one of the devices may change its serving access point and try to establish a connection with the access point that is serving the other device. For example, the sink may connect to the access point that is serving the source device. The source and the sink device may then try to establish a TDLS link with each other.

The various operations of methods described above may be performed by various hardware and/or software component(s) and/or module(s) corresponding to means-plus-function blocks illustrated in the Figures. For example, blocks 802-808 illustrated in FIG. 8 correspond to means-plus-function blocks 802A-808A illustrated in FIG. 8A. In addition, blocks 1202-1206 illustrated in FIG. 12 correspond to means-plus-function blocks 1202A-1206A illustrated in FIG. 12A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a first device, comprising:
   discovering one or more devices of a specific type;
   identifying one or more of the discovered devices that are capable of supporting tunneled direct link setup (TDLS) operation;
   selecting a second device from the one or more identified devices based on one or more device capabilities, wherein the device capabilities comprise one or more of an ability to support display operation over TDLS link or preference to use TDLS; and
   establishing a TDLS link with the second device.

2. The method of claim 1, wherein the discovering is performed utilizing one or more procedures in compliance with a Wireless Fidelity (Wi-Fi) Direct standard.

3. The method of claim 1, further comprising:
   transmitting a request message to the devices comprising request for the device capabilities; and
   receiving one or more response messages from the devices comprising one or more capabilities.

4. The method of claim 3, wherein the request message comprises information about capabilities of the first device.

5. The method of claim 1, wherein the TDLS link is established if the first device and the second device are connected to a common access point.

6. The method of claim 1, further comprising:
   connecting to an access point that is serving the second device if the first and the second devices are connected to different access points.

7. The method of claim 1, further comprising:
   transmitting a synchronization message to the second device; and
   receiving an acknowledgement message in response to the synchronization message.

8. The method of claim 1, further comprising:
   cancelling the TDLS link establishment after a timer expires; and
   establishing a Wireless Fidelity (Wi-Fi) Direct connection between the first and the second devices.

9. The method of claim 1, further comprising:
   storing one or more attributes of the established TDLS link to be used for establishing one or more TDLS links between the first and the second devices in future.

10. An apparatus for wireless communications, comprising:
    means for discovering one or more devices of a specific type;
    means for identifying one or more of the discovered devices that are capable of supporting tunneled direct link setup (TDLS) operation;
    means for selecting a device from the one or more identified devices based on one or more device capabilities, wherein the device capabilities comprise one or more of an ability to support display operation over TDLS link or preference to use TDLS; and
    means for establishing a TDLS link with the device.

11. The apparatus of claim 10, wherein the means for discovering utilizes one or more procedures in compliance with a Wireless Fidelity (Wi-Fi) Direct standard.

12. The apparatus of claim 10, further comprising:
means for transmitting a request message to the devices comprising request for the device capabilities; and
means for receiving one or more response messages from the devices comprising one or more capabilities.

13. The apparatus of claim 12, wherein the request message comprises information about capabilities of the apparatus.

14. The apparatus of claim 10, wherein the TDLS link is established if the apparatus and the device are connected to a common access point.

15. The apparatus of claim 10, further comprising:
means for connecting to an access point that is serving the device if the apparatus and the device are connected to different access points.

16. The apparatus of claim 10, further comprising:
means for transmitting a synchronization message to the device; and
means for receiving an acknowledgement message in response to the synchronization message.

17. The apparatus of claim 10, further comprising:
means for cancelling the TDLS link establishment after a timer expires; and
means for establishing a Wireless Fidelity (Wi-Fi) Direct connection between the apparatus and the device.

18. The apparatus of claim 10, further comprising:
means for storing one or more attributes of the established TDLS link to be used for establishing one or more TDLS links between the apparatus and the device in future.

19. A computer-program product for wireless communications by a first device, comprising a non-transitory computer-readable medium having instructions stored thereon, the instructions being executable by one or more processors and the instructions comprising:
instructions for discovering one or more devices of a specific type;
instructions for identifying one or more of the discovered devices that are capable of supporting tunneled direct link setup (TDLS) operation;
instructions for selecting a second device from the one or more identified devices based on one or more device capabilities, wherein the device capabilities comprise one or more of an ability to support display operation over TDLS link or preference to use TDLS; and
instructions for establishing a TDLS link with the second device.

20. The computer-program product of claim 19, wherein the instructions for discovering comprise instructions for utilizing one or more procedures in compliance with a Wireless Fidelity (Wi-Fi) Direct standard.

21. The computer-program product of claim 19, further comprising:
instructions for transmitting a request message to the devices comprising request for the device capabilities; and
instructions for receiving one or more response messages from the devices comprising one or more capabilities.

22. The computer-program product of claim 21, wherein the request message comprises information about capabilities of the first device.

23. The computer-program product of claim 19, wherein the TDLS link is established if the first device and the second device are connected to a common access point.

24. The computer-program product of claim 19, further comprising:
instructions for connecting to an access point that is serving the second device if the first and the second devices are connected to different access points.

25. The computer-program product of claim 19, further comprising:
instructions for transmitting a synchronization message to the second device; and
instructions for receiving an acknowledgement message in response to the synchronization message.

26. The computer-program product of claim 19, further comprising:
instructions for cancelling the TDLS link establishment after a timer expires; and
instructions for establishing a Wireless Fidelity (Wi-Fi) Direct connection between the first and the second devices.

27. The computer-program product of claim 19, further comprising:
instructions for storing one or more attributes of the established TDLS link to be used for establishing one or more TDLS links between the first and the second devices in future.

28. An apparatus for wireless communications, comprising:
at least one processor configured to:
discover one or more devices of a specific type,
identify one or more of the discovered devices that are capable of supporting tunneled direct link setup (TDLS) operation,
select a device from the one or more identified devices based on one or more device capabilities, wherein the device capabilities comprise one or more of an ability to support display operation over TDLS link or preference to use TDLS, and
establish a TDLS link with the device; and
a memory coupled to the at least one processor.

29. The apparatus of claim 28, wherein the discovering is performed utilizing one or more procedures in compliance with a Wireless Fidelity (Wi-Fi) Direct standard.

30. The apparatus of claim 28, wherein the at least one processor is further configured to:
transmit a request message to the devices comprising request for the device capabilities; and
receive one or more response messages from the devices comprising one or more capabilities.

31. The apparatus of claim 30, wherein the request message comprises information about capabilities of the apparatus.

32. The apparatus of claim 28, wherein the TDLS link is established if the apparatus and the device are connected to a common access point.

33. The apparatus of claim 28, wherein the at least one processor is further configured to:
connect to an access point that is serving the device if the apparatus and the second device are connected to different access points.

34. The apparatus of claim 28, wherein the at least one processor is further configured to:
transmit a synchronization message to the device; and
receive an acknowledgement message in response to the synchronization message.

35. The apparatus of claim 28, wherein the at least one processor is further configured to:
cancel the TDLS link establishment after a timer expires; and establish a Wireless Fidelity (Wi-Fi) Direct connection between the apparatus and the device.

36. The apparatus of claim 28, wherein the at least one processor is further configured to:
store one or more attributes of the established TDLS link to be used for establishing one or more TDLS links between the apparatus and the device in future.

\* \* \* \* \*